United States Patent [19]

Buisson et al.

[11] Patent Number: 4,844,637

[45] Date of Patent: Jul. 4, 1989

[54] KEYBOARD WITH ALTERABLE CONFIGURATION

[75] Inventors: Jean-Michel Buisson, Colombes; Jean-Marie Soubrier, Gentilly, both of France

[73] Assignee: Thomson-CSF, Paris, France

[21] Appl. No.: 200,854

[22] Filed: Jun. 1, 1988

[30] Foreign Application Priority Data

Jun. 5, 1987 [FR] France ............................. 87 07944

[51] Int. Cl.$^4$ .................... B41J 5/10; G06F 3/02
[52] U.S. Cl. ................................ 341/23; 400/479; 400/486; 400/90; 340/711
[58] Field of Search ............................ 400/479, 486; 340/365 VL

[56] References Cited

U.S. PATENT DOCUMENTS

| | | | |
|---|---|---|---|
| 3,560,964 | 2/1971 | Bedell | 340/365 VL |
| 3,956,745 | 5/1976 | Ellis | 340/365 VL |
| 4,092,527 | 5/1978 | Luecke | 340/365 VL |
| 4,145,742 | 3/1979 | Olander | 340/365 VL |
| 4,313,108 | 12/1972 | Yoshida | 340/365 VL |
| 4,633,227 | 2/1980 | Menn | 340/365 VL |
| 4,715,736 | 12/1987 | Mc Gunnigle | 400/486 |

FOREIGN PATENT DOCUMENTS

| | | | |
|---|---|---|---|
| 3409980 | 9/1985 | Fed. Rep. of Germany | 340/365 VL |
| 2565163 | 12/1985 | France | 400/479 |
| 126674 | 1/1985 | Japan | 340/365 VL |

OTHER PUBLICATIONS

Patent Abstracts of Japan, vol. 8, No. 38 (P-255) [1475] 18 fevrier 1984; & JP-A-58 191 060 (Sharp K.K.) 08-1-1-83 * Resume *.

*Primary Examiner*—William Pieprz
*Assistant Examiner*—Steven Kelley
*Attorney, Agent, or Firm*—Oblon, Spivak, McClelland, Maier & Neustadt

[57] ABSTRACT

Several different symbols may be assigned to each key of the keyboard as requested by the operator. All the various symbols of the keys are recorded in a memory where they are organized in a certain number of pre-defined, distinct configurations of the keyboard. The configuration chosen by the operator is recorded in a display memory and displayed by means of a graphic unit on a flat panel, for example a liquid crystal display panel. The key actuated by the operator is identified by a decoding circuit to determine its symbol by means of the display memory and to display it on the flat panel.

13 Claims, 3 Drawing Sheets

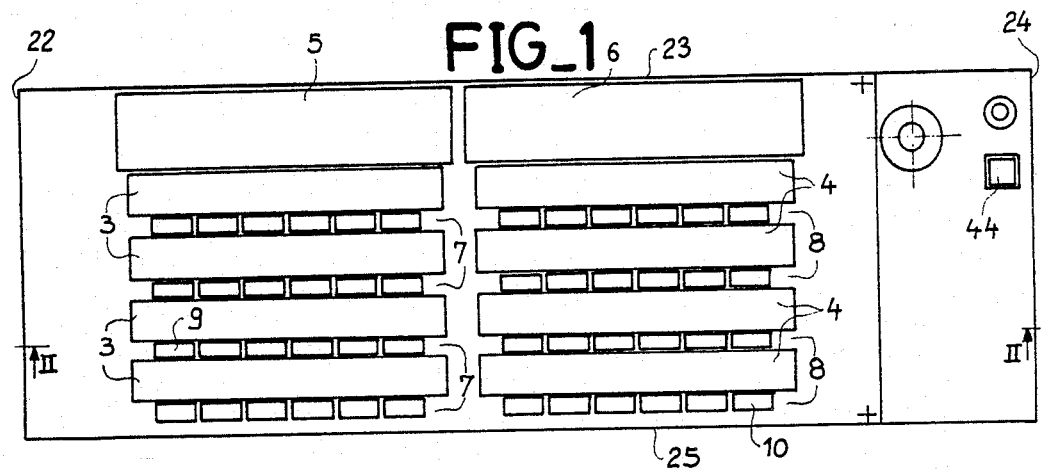
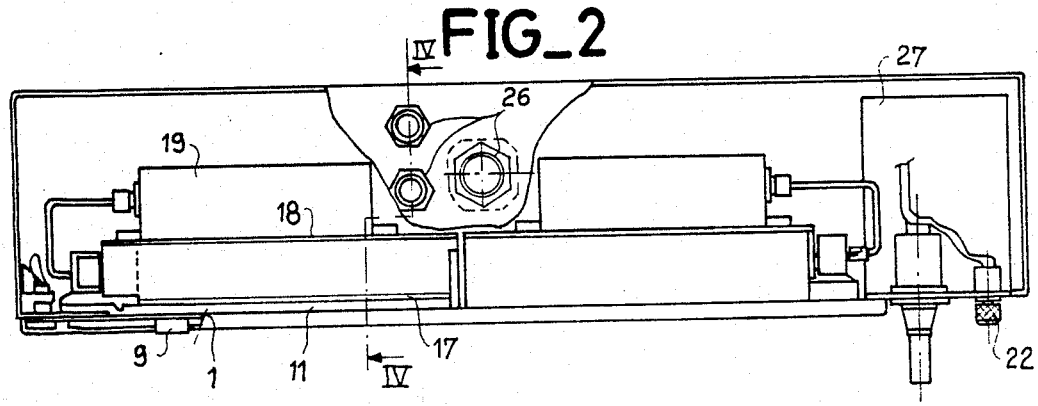
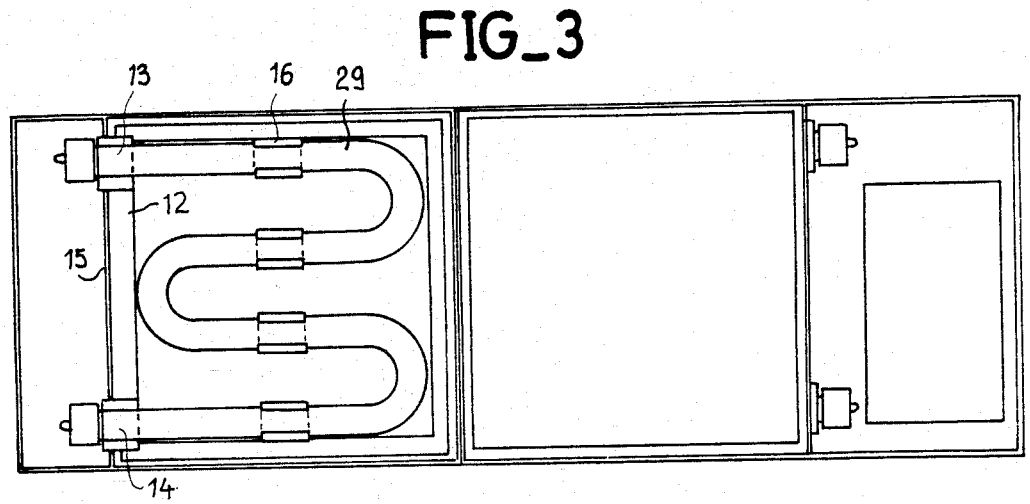

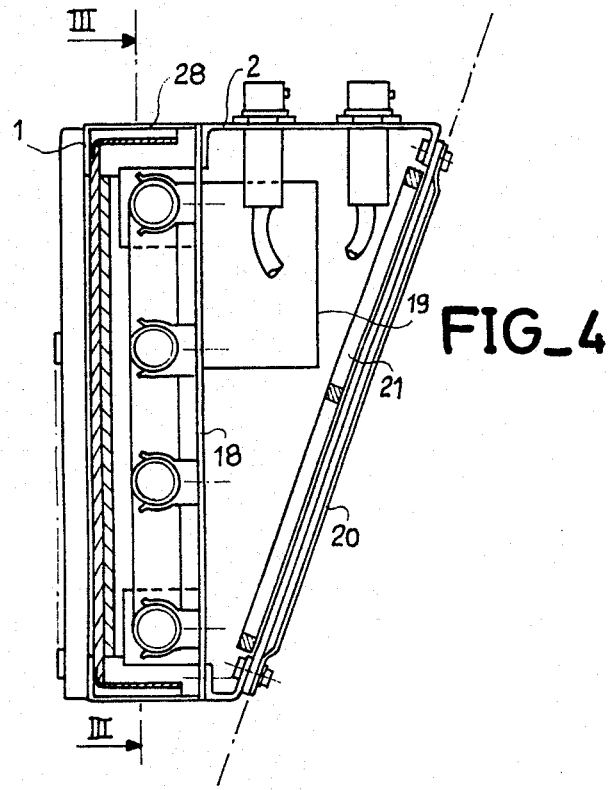
FIG_4
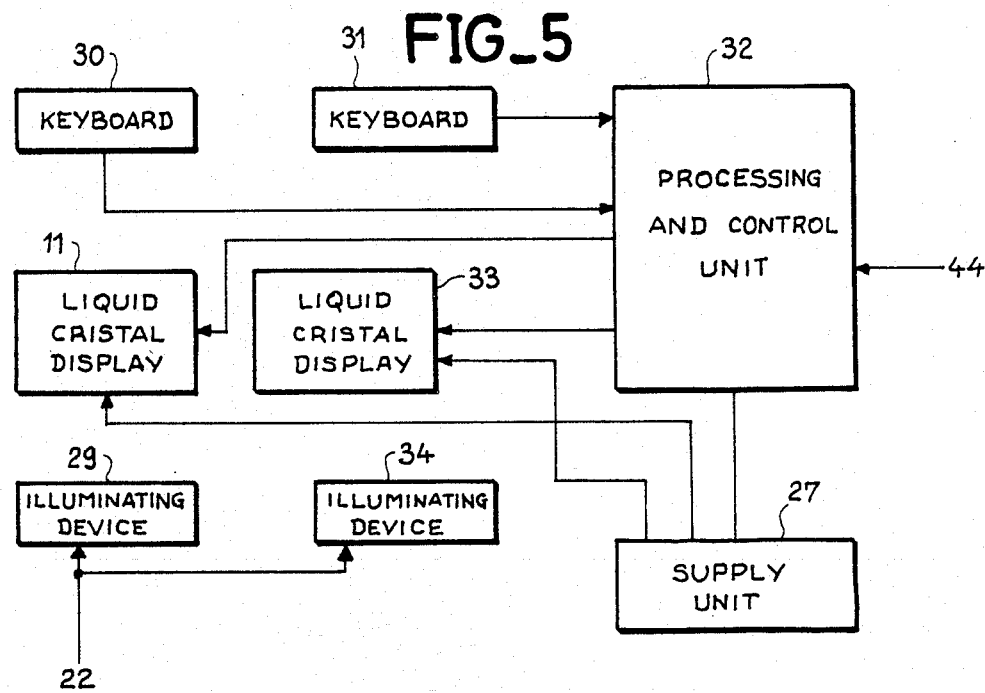
FIG_5

FIG_6
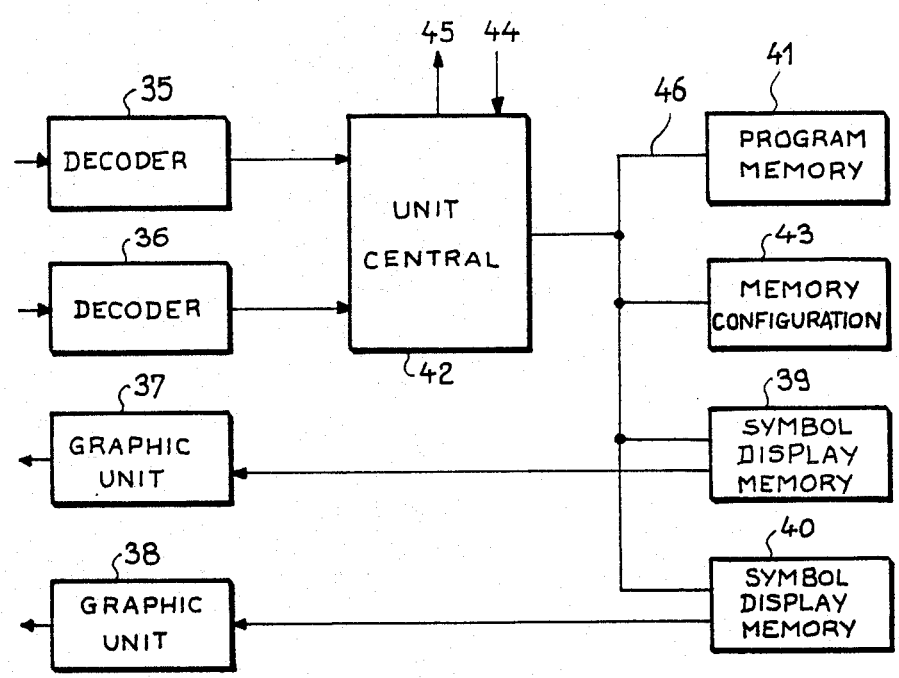

KEYBOARD WITH ALTERABLE CONFIGURATION

BACKGROUND OF THE INVENTION

1. Field of the Invention

The invention concerns keyboards in general but, more particularly, keyboards with alterable configurations wherein the keys may have different symbols as requested by the user, i.e. their configuration can be altered as regards both the symbols themselves and the display of these symbols.

Typewriters have keyboards with alterable configurations inasmuch as each key has two symbols attached to it, for example lower-case letters and capital letters. But the display of the symbol for the letters is not changed from one symbol to another, since only the capital letter is shown on the key. When the two symbols are very different, a figure and another sign for example, these two symbols are put on the key itself.

Computers as such or computers integrated in machines are controlled from control desks in which the main element is a keyboard which is often associated with a printer and a display device such as a cathode tube screen. To simplify and facilitate dialogue between the computer and the user, keyboards have numerous keys corresponding to alphanumerical characters, and each additional key corresponds to a well-defined function. This leads to a substantial increase in the number of keys as and when the number of functions increases for it is difficult to go beyond two symbols, hence beyond two displays, per key. Furthermore, this increase in the number of keys results in keyboards of increasingly greater sizes which are sometimes incompatible with certain applications.

2. Description of the Prior Art

A number of approaches have been proposed to solve this problem of changing the symbols related to the keys and the corresponding display.

In one of these methods, a symbol displaying device such as a liquid crystal array is integrated into each key, the display being controlled by electrical links combined with the motion of the key. In a solution of this type, the electrical links are complicated and the clarity of the display is reduced by soiling and by the deterioration of the anti-reflection treatment due to contact with fingers. Furthermore, in general, the cost price of a keyboard of this type is high because of the cost of the mechanical device of the keys for electrical links.

In a second approach, a transparent film with integrated contacts is deposited on a display screen which displays the symbols related to the contacts. A device of this type has the chief disadvantage of giving a view affected by the parallax, unwanted reflections, losses in transmission and soiling due to contact with fingers. Moreover, there is no mechanical sensation of contact with the key, which the operator needs even if each action of the key is accompanied by a sound signal.

In a third approach, a set of light-emitting diodes is arranged on the periphery of a display screen. These light-emitting diodes are associated with photo-detectors or photo-sensitive cells so as to create a matrix arrangement of lines and columns, each line and column being defined by a light-emitting diode and a light-sensitive cell. Each key corresponds to an intersection of a line and a column, and its associated symbol is displayed on the display screen at each intersection. Thus a key is chosen by an operator's finger which intercepts the light ray from a line and a column thus defining the position of the key and, hence, the symbol attached to it. A device of this type has the following disadvantages: there is no mechanical sensation in the choice of a "key"; there is a risk of jamming following the interposing of a mask in the light beams of the lines and columns; a line or column of keys may be lost if the transmitter or corresponding receiver malfunctions and there are unwanted reflections on the surface of the display screen if the light beams are not sufficiently directional and narrow.

An aim of the present invention is to make a keyboard with a special type of alterable configuration which does not have the above-mentioned disadvantages of prior art keyboards and uses at least one flat display panel and at least one row of keys as well as associated electronic circuits.

Another aim of the present invention is a keyboard with an alterable configuration organized into two independent parts, each part being capable of functioning in back-up mode in the event of a malfunction in the other part.

Yet another aim of the present invention is a keyboard with a alterable configuration which enables the immediate display of messages, especially the symbol associated with the key actuated by the user.

SUMMARY OF THE INVENTION

The invention relates to a keyboard with an alterable configuration comprising: at least one flat display panel associated with at least one row of keys placed so as to be adjacent to the said display panel; memorizing means to assign a set of possible symbols to each key of the row; means to select the symbol chosen for each key of the row; means for displaying, on said display panel, the symbol chosen for each key of the row by the selection means; means to identify the actuated key and means to indicate the actuated key by displaying its symbol on the said flat display panel.

Preferably the reconfigurable keyboard has at least two flat display panels and two rows of associated keys, each flat panel being associated with display means and each row of keys being associated with identifying means so that, in the event of malfunctioning, one of the flat panels can be replaced by the other, and one of the rows of keys can be replaced by the other.

The means for using the symbol associated with the actuated key comprise, for example, another flat display panel with which no row of keys is associated, said flat panel being used to display the symbol associated with the key actuated under the control of the display means.

When several flat panels, each associated with a row of keys, is used to make a keyboard, the invention proposes to make them in the form of one or two flat panels on which the rows of keys demarcate display zones, masking the corresponding part of the said flat panel or panels. In this case, the rows of keys are borne by parallel strips which demarcate said display zones. These parallel strips may constitute a moveable grid which is mounted on the flat panel or panels.

BRIEF DESCRIPTION OF THE DRAWINGS

Other characteristics and advantages of the present invention will emerge from the following description of a special embodiment, said description being made with reference to the appended drawings of which:

FIG. 1 is a top view of a keyboard with an alterable configuration according to the invention;

FIG. 2 is a partial cross sectional view of the keyboard along the line II—II of FIG. 1;

FIG. 3 is a partial cross sectional view of the keyboard along the line III—III of FIG. 4;

FIG. 4 is a partial cross sectional view of the keyboard along the line IV—IV of FIG. 2;

FIG. 5 is a functional diagram of the keyboard according to the invention, and

FIG. 6 is a functional diagram of the processing and control circuit 32 of FIG. 5.

DESCRIPTION OF THE PREFERRED EMBODIMENT

A special embodiment of a keyboard with an alterable configuration according to the present invention comprises (FIGS. 1 to 4) a plate 1 fixed to a support 2 by means of folded parts 28.

The shape of the support 2 is such that the plate 1 is slightly tilted with respect to the horizontal plane as is the case with a typewriter keyboard. The plate 1 is drilled, in particular, with eight identical rectangular openings or windows, 3 and 4, separated by strips 7 and 8 respectively. This strips 7 and 8, which have the same width, act as supports for the forty-eight keys such as those marked 9 and 10. These keys are preferably of the mechanically actuated type. At its upper part, the plate 1 has two other identical, rectangular openings or windows, 5 and 6, the dimensions of which are greater than those of the openings 3 and 4. These openings 5 and 6 may be not separated from the other two openings, placed just below so that each opening constitutes one and the same window with the adjacent opening marked 3 or 4.

As FIGS. 2 and 4 show, the keys are placed on the outside of the plate 1. On the inside of the plate 1 are fixed two flat panels such as the one marked 11, each flat panel occupying, for example, the openings 3, 5 (or 4, 6) as well as the strips 7 (or 8) on which the keys are arranged. Each flat panel is, for example, of the liquid crystal display type and may consist of a matrix comprising 640×880 elementary points distributed on a square with a side about 4.8 inches long. This panel may be of the color screen type. In this case, the elementary points are set in groups of 4, two in the horizontal direction and two in the vertical direction, each group of four points constituting a pixel.

The illumination of each liquid crystal matrix is obtained, for example, by a fluorescent tube 12 placed beneath the matrix and kept in place by its ends 13 and 14, fixed to a plate 15. Clips 16 are also provided to improve the mechanical holding of the fluorescent type. To ensure uniform lighting of the matrix, said matrix rests on an obscured glass 17. To improve this illumination, the light emitted by the tube towards the side opposite to the matrix is reflected towards this matrix by two types of mirror such as a chrome-plated metallic plate 18. The ends 13 and 14 of the fluorescent tube 12 are connected to a supply device 19.

The plate 1 and the support 2 form a casing. The front side of this casing, which is tilted with respect to the horizontal plane, comprises the plate 1. The rear side of the casing consists of a back 20 which is detachable so as to give access to the interior of the casing. This back 20 is planned so as to act as a support for printed circuit boards 21 for electronic circuits, the functions of which are described further below.

The front side of the keyboard can be used as a support for various manual control devices such as a button 22 to set the lighting intensity of the fluorescent tubes or, again, a key 44 that validates the actuated keys. Similarly, the lateral sides 22 to 25 of the casing can act as supports for other elements such as the guides 26 on the side 23 for the passage of electrical cables or, again, for an electrical supply device 27.

With the keyboard that we have just described, the mechanical arrangement of the different elements, especially all the keys and the two liquid crystal displays 11 and 33, it is possible, by means of the electronic circuits which will be described in relation to FIGS. 5 and 6, to display, on the matrices, at the openings 3 and 4, the various symbols chosen for the facing keys and to alter them as required, to any of the various possible symbols associated with each key. Furthermore, it is possible to display the alphanumeric messages or other symbols on those parts of the matrices 11 and 33 corresponding to the windows 5 and 6.

In FIG. 5, which is a functional diagram of the electronic circuits, it is seen that the 48-key keyboard is divided into two separate parts 30 et 31 which are connected separately to a processing and control circuit 32. This circuit 32 is also connected separately to the liquid crystal display panels 11 and 33 with which are respectively associated the illuminating devices 29 and 34, each comprising a fluorescent tube and a supply device marked 12 and 19 for the illuminating device 29. This circuit 32 prepares the display signals for the alphanumeric characters on each of the liquid crystal display panels 11 and 33 so as to display the symbol associated with each of the keys, identify the actuated keys, determine the symbol associated with each of the actuated keys and display, in the windows 5 and/or 6, the symbol associated with the said actuated keys. These different elements are powered by the supply device 27.

The processing and control circuit 32 comprises (FIG. 6) essentially two decoding circuits 35 and 36 for the identification of the actuated keys, one per elementary keyboard, two graphic units 37 and 38 for generating alphanumeric characters and other symbols, each associated with a liquid crystal display panel, memories 39, 40, 41 and 43 which memorize all the possible symbols associated with each key and the configuration chosen for each key in this set, and a central unit 42 which controls all the elements listed above. This central unit 42 receives the data and/or control signals from accessory devices such as the validation key marked 44 in FIGS. 1 and 2. The central unit which actually comprises a microprocessor is connected to different memories 39, 40, 41 and 43 by a bus 46 which is used to transfer digital data among these different elements.

This central unit 42 also provides, on the output conductors 45, data signals which are designed for a data-processing system, the keyboard of which is a peripheral unit. This data-processing system sends data signals to the input conductors 29. The purpose of these signals may be to cause the display of messages in the windows 5 and/or 6.

The various components of this processing and control circuit 32 are known, and are available from many dealers in the market.

The memories 39, 40 and 41 are of the random-access type while the memory 43 is of the programmable type. The memories 39 and 40 are allocated to the recording of the symbols or messages which should be displayed on the matrices 11 and 33 by means of the graphic units 37 and 38. The memory 41 is allocated to the needs of the central unit 42 for its operation. The memory 43 is designed to record all the possible symbols associated with each key of the keyboard. This set of possible symbols can be organized in different configurations of the keyboard so that the operator can choose one keyboard configuration among a certain number and not one symbol for each of the keys among all the possible symbols.

In brief, the alterable keyboard according to the invention works as follows. When the keyboard is turned on, the circuit 32 is programmed to make the respective symbols associated with the adjacent keys appear on the matrices 11 and 33, at the windows 3 and 4, said symbols corresponding to a selected configuration, for example all the alphanumerical characters.

When a key, for example the letter A, is pushed, its position or identity is determined by one of the identification circuits 35 or 36 depending on the part of keyboard, 30 or 31, concerned. This position or identity is then interpreted by the central unit 32 by means of the memories 39 and 40 to ascertain the symbol (the letter A) attached to the actuated key. The central unit 32 then commands one of the graphic units 37 or 38, through the memories 39 or 40, respectively to display the letter A in either of the windows 5 or 6.

To change the configuration of the keyboard, the operator, depending on the programming, may either actuate a key provided for this purpose or type a message using the keys of the keyboard. In reply, the circuit 32 gives him the choice of possible configurations through messages displayed in the windows 5 and 6. When the operator has made his choice, this new configuration is displayed by the central unit in the windows 3 and 4, through the memories 39 and 40 and the graphic units 37 and 38.

It must be noted that the division of the keyboard into forty-eight keys, in two parts independent of each other in terms of both keys and panels, enables the use, in certain circumstances such as a malfunction, of only one part of the keyboard, consisting of a matrix 11 or 33 and the corresponding keys 30 or 31. Initially, the functioning part of the keyboard has a configuration corresponding to half of the total keyboard, and then, in a second stage, it has a configuration corresponding to the other half, either configuration being called up by the operator depending on the messages that he has to formulate.

The keyboard that has just been described has the main advantage of enabling several possible configurations, the number of these configurations being limited solely by the capacity of the memory 43.

Another advantage of the keyboard according to the invention lies in the fact that the keys and the device that displays their associated symbols, namely the associated liquid crystal display panel, are mechanically and electrically separated as regards both assembly and use, thus making it possible to obtain and maintain optimum qualities for the keys and the display without interaction among the keys.

This independence between the keys and associated liquid crystal display panel also has the advantage of facilitating repairs and, especially, the replacement of either element in the event of the malfunctioning of a single element.

The space used up for the display and the ranges of keys which mask a portion of the liquid crystal display panels may be reduced by using small-sized keys. These parts of matrices which are masked are not powered and, therefore, consume no electrical energy.

In the special embodiment which has been described, the keys are arranged on the strips 7 and 8 between the windows 3 and 4 drilled in the plate 1. Of course, by eliminating the strips 7 and 8, two windows with the dimensions of the liquid crustal display panels would be obtained. On these liquid crystal displays, it would be possible to place two movable grids to support the keys. Grids of this type facilitate repairs and, especially, the replacement of faulty keys, but they also enable the use of the entire surface of a liquid crystal display screen as a zone for the display of messages as in the zones demarcated by the windows 5 and 6, by simply withdrawing the grid of associated keys.

The special embodiment, as described above, comprises several rows of keys each row being adjacent to a window which demarcates the zone for displaying the symbol for each key of the row. It is obvious that the invention applies to a single row of keys associated with a liquid crystal array and, more generally, following this same line of thinking, to several rows of keys each associated with a liquid crystal array. This also applies to display zones demarcated by the windows by the windows 5 and 6 which may each be replaced by a liquid crystal array. When liquid crystal arrays are used, the rows of keys are interposed between the arrays and it is no longer necessary to use thin keys since there is an available volume between the strips.

The display zones demarcated by the windows 5 and 6 are used firstly to display the symbols associated with the actuated keys and, secondly, to display the messages sent to the operator by the data-processing system, for which the keyboard is a peripheral organ. It is obvious that the messages intended for the operator may be of any kind, and may indicate, for example, a set of possible choices to be made through the keyboard. To make this choice, the keyboard may be reconfigured as required by the processing system so as to simplify the choice imposed on the operator and, in this configuration, only those keys that are indispensable for this choice as well as the associated display zones will be used. This shows that the keyboard with an alterable configuration, according to the invention, has great flexibility of use for better communication between the operator and the data-processing system.

In the description, it is provided that the symbol associated with the actuated key is displayed in one of the zones demarcated by the windows 5 and 6: this means that the corresponding key has been actuated. Of course, the data indicating that a key has been actuated can be displayed by any other means, for example by modifying the luminosity or color of the characters or symbols corresponding to the symbol of the actuated key. This method can clearly be used when the processing system gives the operator various possible choices in the zones demarcated by the windows 5 and 6 in the operating mode, as described in the previous paragraph.

It may be noted that each zone provided for the display of the symbol associated with the adjacent key can be planned for one or more characters, figures or symbols arranged on one or more lines, thus making it possible to establish groups of characters, figures or symbols which correspond to abbreviations of words having a connotation corresponding to the real words that describe the functions which they are supposed to define.

As described above, each liquid crystal display panel is illuminated by means of a fluorescent tube which occupies a large space. This fluorescent tube can be replaced by a less bulky device comprising light-emitting strips or a light-emitting plate placed beneath the liquid crystal display panel. The light-emitting plate will be used preferably for a liquid crystal display panel while the light-emitting strips will be used preferably for liquid crystal arrays.

The invention has been described for an embodiment comprising two liquid crystal display panels, but it may be noted that it can be applied to other types of flat panels such as plasma panels, LED panels and electroluminescent screens etc.

What is claimed is:

1. A keyboard with an alterable configuration comprising: two flat display panels, each associated with at least one row of keys placed so as to be adjacent to said panel; memorizing means to assign a set of possible symbols to each key of the row; means to select the symbol chosen for each key of the row, each panel being also associated with means for displaying the symbol chosen by the selecting means on the corresponding panel, each row of keys being associated with means to identify the actuated key so as to work independently and so that, in the event of malfunctioning, one of the flat panels can be replaced by the other panel, and one of the rows of keys can be replaced by the other row of keys; means to extract the symbol of the actuated key and means to indicate the actuated key by displaying its symbol on the associated flat panel.

2. A keyboard according to claim 1 wherein the means for using the symbol of the actuated key comprise at least one flat panel on which the symbol of the actuated key is displayed.

3. A keyboard according to claim 1 wherein the different flat panels are made up of at least one, single flat panel which comprises zones to display the symbols of the keys of the rows and a zone to display the symbol of the actuated key, each display zone other than the one assigned to the display of the symbol of the actuated key being associated with a row of keys which masks a corresponding surface of the single flat panel and the zone for displaying the symbol of the actuated key being adjacent to one of the zones for displaying the symbol of the keys.

4. A keyboard according to claim 1 wherein the memorizing means comprise a configuration memory which records, for each key, all the possible symbols, said symbols being organized in several symbol configurations of all the keys.

5. A keyboard according to claim 4 wherein the means for selecting the symbol chosen for each key comprise a central unit which chooses one of the configurations of keys.

6. A keyboard according to claim 5 wherein the display means comprise at least one memory which records the chosen symbols and at least one graphic unit which prepares the control signals for display on the flat panels, said memories being controlled by the central unit.

7. A keyboard according to claim 5 wherein the means for identifying the actuated key comprise at least one decoding circuit connected, firstly, to the rows of keys and, secondly, to said central unit.

8. A keyboard according to claim 3 wherein the single flat panel is fixed to a plate and wherein the display zones are demarcated by windows which are drilled in the plate and which define the supporting strips for the rows of keys.

9. A keyboard according to claim 8 wherein the display zones are demarcated by a movable grid consisting of a plate drilled with windows which are separated by strips used to support rows of keys, it being provided that said grid is placed on the flat panel.

10. A keyboard according to claim 1 wherein the flat screen is of the liquid crystal display type, illuminating means being then provided to illuminate one side of the said liquid crystal display.

11. A keyboard according to claim 1 wherein the flat panel is of the light-emitting diodes type.

12. A keyboard according to claim 1 wherein the flat panel is of the plasma type.

13. A keyboard according to claim 1 wherein the flat panel is of the electroluminescent screen type.

* * * * *